Sept. 20, 1971      C. H. MORRETT      3,605,840
APPARATUS FOR COMMINUTING COMESTIBLES
Filed July 17, 1969
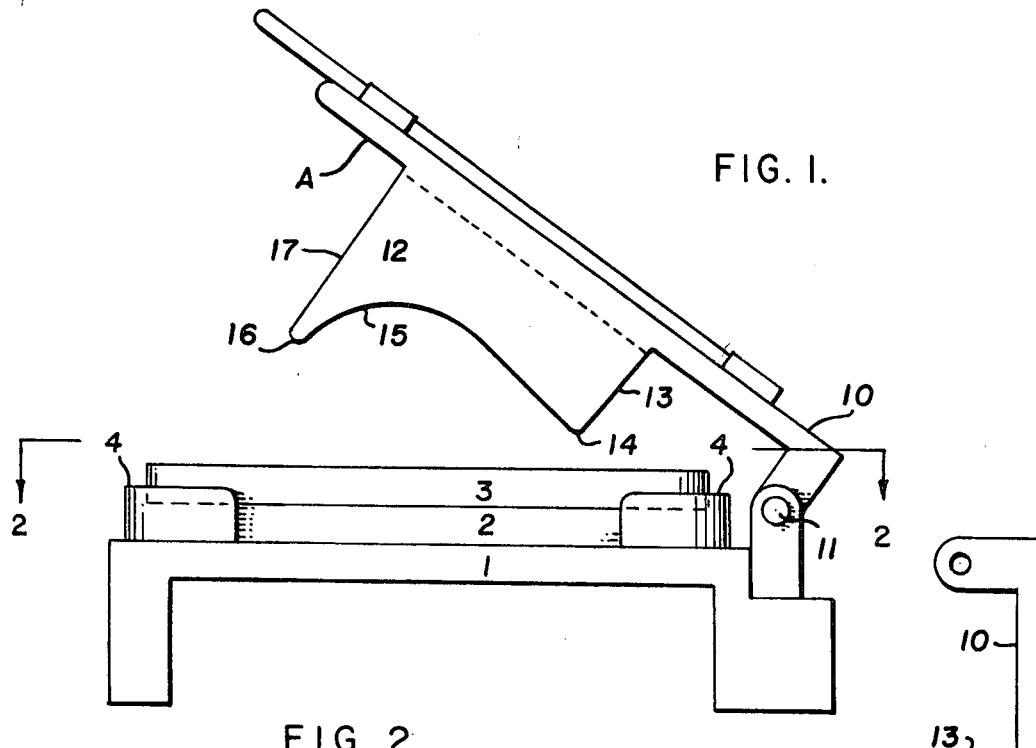
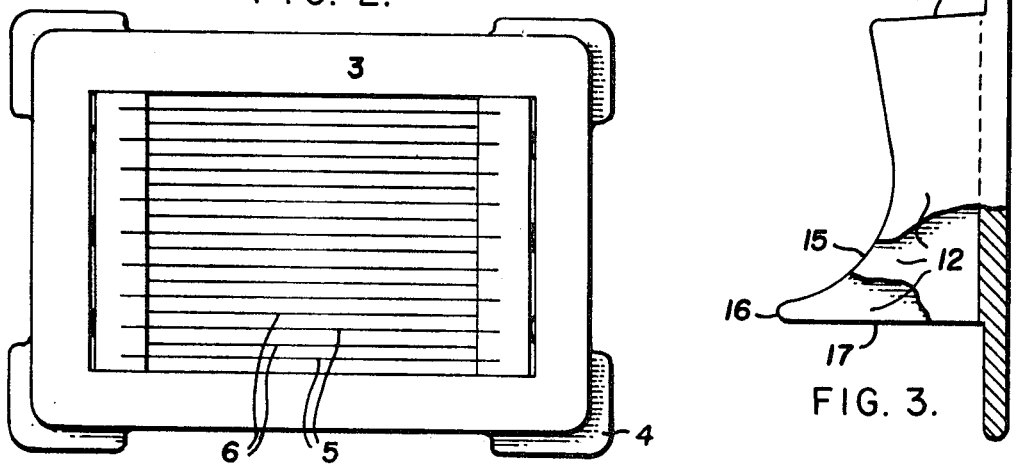
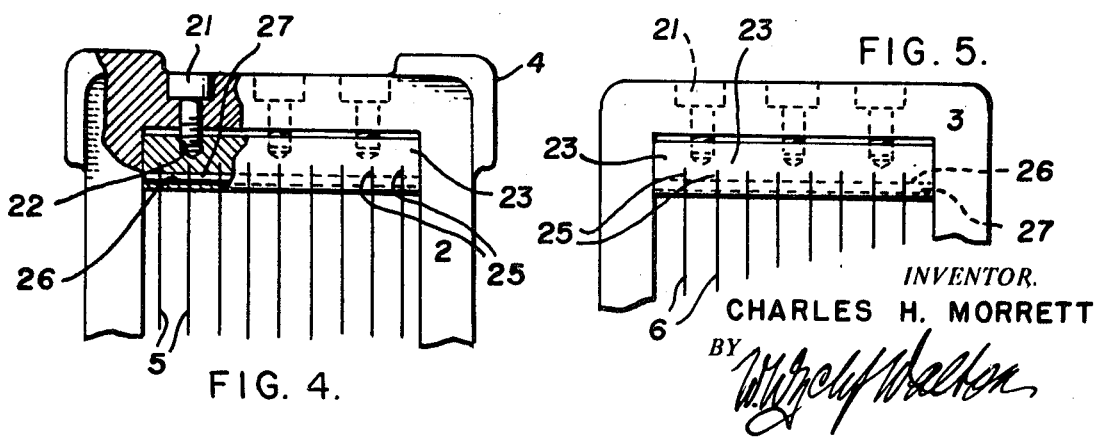
INVENTOR.
CHARLES H. MORRETT
BY
ATTORNEY.

United States Patent Office 3,605,840
Patented Sept. 20, 1971

3,605,840
APPARATUS FOR COMMINUTING COMESTIBLES
Charles H. Morrett, 16 Willowbrook Road,
Bromall, Pa. 19008
Filed July 17, 1969, Ser. No. 842,510
Int. Cl. B26d 3/26
U.S. Cl. 146—169
3 Claims

ABSTRACT OF THE DISCLOSURE

This invention relates to apparatus for comminuting fruit, vegetables and the like comprising superposed harps or sets of parallel cutting blades in which the blades in each set are laterally offset with respect to those in the other set, together with impeller blades of novel design whereby the article to be cut is first presented in a slightly rotative motion to the superior blade set and by them progressively severed into relatively thick slices, and then by the same motion of the impeller blades presented to the cutting blades of the inferior set whereby the thick slices are bifurcated and thus reduced to relatively thin ones; thereafter the slices may be piled together and rotated through 90° for reducing them to slivers which in a further pass may be "diced" if desired.

BACKGROUND OF THE INVENTION

The apparatus embodying this invention is useful primarily in the culinary arts for reducing to a desired comminuted state such comestibles as onions, lettuce, potatoes and tomatoes, hard boiled eggs and the like and is useful over a wide range of such food products, unlike apparatus heretofore available which, if capable of cutting tomatoes into uniform slices, does not accept more resistant articles such as carrots or onions.

FIELD OF THE INVENTION

The field of endeavor in which it is considered the invention is primarily if not exclusively useful is in reducing to parallel sided slices, elongated slivers or even smaller comminuted particles articles of food either immediately edible or in preparation for cooking and the invention is deemed as one the preferred embodiment of which offers certain advantages over apparatus heretofore designed for the attainment of like objectives.

THE PRIOR ART

Many specifically different mechanical devices have heretofore been suggested for subdividing fruits, vegetables and the like, including slicers designed to sever successive slices from the whole, and other machines comprising parallel cutting blades intended for simultaneous severing of a plurality of slices, these latter usually comprising an arrangement of fingers or plates adapted to enter spaces between adjacent cutting blades to insure passage of the slices between them.

In some instances these have included pressure applying means which directly force the article to be cut into contact with the cutting blades in a direction substantially normal to the cutting edges of the blade, or at a relatively sharp angle thereto in the planes of the blades. The first of these is usually successful in cutting fruits, vegetables, and the like of relatively firm and substantially uniform and relatively solid nature such as beets, lettuce, hard boiled eggs and the like while the second is most successful in the slicing of articles having resistant outer rinds or skins and relatively yielding interior parts, such as tomatoes and the like, and so far as I am aware the machines most successful in the slicing of members of one such category are generally less so when the attempt is made to slice members of the other.

It appears not unlikely, from this division of capability among the prior art devices that when the angle of attack upon the cutting edges is other than normal thereto the initial incision of a relatively tough rind or skin is facilitated but cutting of relatively dense objects is inhibited due to excessve strains on the blades, whereas when the angle of attack is approximately normal to the cutting edges relatively dense objects are readily severed but the resistant rinds or skins of tomatoes and the like are pressed into the yielding flesh of the article which may then be crushed against the cutting blades rather than cut into slices by them.

SUMMARY OF THE INVENTION

The apparatus embodying the invention comprises a pair of preferably rectangular frames carrying spaced parallel cutting blades removably disposed in a supporting structure to which is hinged a follower arm comprising impeller blades aligned with spaces between adjacent blades in said frames and having a distinctive and substantially critical contour whereby when actuated to impel an article to be comminuted past the cutting blades, it induces the severing of the same and discharge of the resultant severed pieces beyond the cutting blades and onto a receiving surface, the action of the impeller blades in causing a slight rotative motion of the article relatively to the cutting blades at the instant of encounter, thus facilitating the initial broaching of a relatively tough and impermeable skin or rind on the article.

BRIEF DESCRIPTION OF THE DRAWING

In the accompanying drawing:

FIG. 1 is a side elevation of the apparatus prepared for the reception of an article to be comminuted;

FIG. 2 is a fragmentary top plan view of the cutting blades and their supporting frames taken on the line 2—2 in FIG. 1;

FIG. 3 is a fragmentary side elevation of the follower element apart from the apparatus specifically illustrating the configuration of a number of substantially identical impeller blades comprised in said element;

FIG. 4 is a fragmentary top plan view of one of the cutting blade frames included in the apparatus and FIG. 5 is a generally similar view of the other cutting blade frame.

DESCRIPTION OF THE PREFERRED EMBODIMENT

Referring now more particularly to the drawing there is illustrated therein a preferred embodiment of the invention comprising a base or frame 1 of more or less conventional character the specific construction of which constitutes no part of the invention. It provides a support for a pair of substantially rectangular cutting blade frames 2, 3 the latter being removably superposed upon the former and held in position thereon by upstanding corner brackets 4 in which the corners of the upper frame 3 are received, each of said frames carrying a plurality of cutting blades or knives 5, 6 the arrangement and mounting of which will be hereinafter more fully explained.

The frame 1 also provides support for a follower arm 10 pivoted thereto on a horizontal pivot pin 11 and carrying a plurality of parallel preferably integral impeller blades collectively designated 12 adapted to enter the spaces defined by cutting blades 5, 6 on frames 2, 3 when the latter are disposed in their respective normal positions on frame 1.

The impeller blades 12 are of a novel and substantially critical configuration at the edges thereof designed to engage an article to be sliced. Thus considering the plane A of the underside of the pivoted frame as a base that edge 13 of each of the impeller blades nearest pivot-pin 11 extends substantially normal thereto about 1.562" thence around a rounded corner 14 and rectilinearly therefrom in a direction away from the frame pivot at an acute angle of about 8° to plane A approaching said plane to about 1¼" whereupon it merges into a 90° arc 15 on a 1¾" radius centered on a perpendicular to plane A through the end of the rectilinear portion, thence rounding a corner 16 on a short radius to a rectilinear edge 17, returning at a right angle to plane A. The contour of these edges, specifically the rectilinear edge at 8° to plane A and the curved 90° arc portion 15 is such as to greatly facilitate initial incision by the cutting edges of the cutting blades when an object to be sliced is placed thereon in frame 3 and the arm 10 moved about its pivot 11 to bring the impeller blades into contact with it. More specifically the configuration of the impeller blade edges just described is such that as the arm 10 moves them toward the cutting blades the article is caused to rotate slightly about a horizontal axis and hence move its surface slightly longitudinally of the blades when it initially is forced into contact with them. This facilitates initial penetration of the cutting edges of said blades through a rind or tough outer skin of the object prior to severing of the latter into parallel sided slices as it passes through the spaces between adjacent blades.

The cutting blades in frame 2 are desirably transversely offset with respect to those in frame 3 so that as an article passes the former and is cut into relatively thick slices thereby these slices then immediately encounter the subjacent cutting blades in frame 2 and are severed thereby into relatively thin slices before being discharged from the machine as the impeller blades pass between and beyond the lower cutting blades to deposit the slices on the subjacent supporting surface or in a receptacle disposed thereon. The slices may then be repositioned on the cutting edges of the cutting blades in frame 3, after retraction of the impeller blades and the latter then actuated to force the slices through the cutting blade sets for reducing them to elongated slivers, as for "Julienne" vegetables. For dicing, the slivers may be placed cross-wise on the cutting blades and subjected to a third pass through the machine.

Returning now to the structure of operating elements of the machine, the frames 2, 3 preferably provide at their ends recessed bores 20 in which are entered adjusting screws 21 threaded into sockets 22 in cross bars 23 of which one is disposed at each end of each frame. Each of these bars is provided with a plurality of transverse slots 25 and a longitudinal bore 26 whereby the cutting blades which are perforated adjacent their ends when received in the slots permit passage therethrough of blade retaining rods 27 disposed in bores 26 whereby the cutting blades are secured to the cross bars. Adjustment of screws 21 thus maintains adequate longitudinal tension on the cutting blades in each frame while affording convenient means for facilitating replacement of a cutting blade, should one become broken and permitting removal of all the cutting blades for sharpening should they become dull, or for cleaning when desired.

The means employed in the preferred embodiment illustrated for securing the cutting blades in their frames, and for permitting adjustment of the longitudinal tension to which they are subjected are not believed critical, as other specific means for accomplishing these objectives will readily occur to those skilled in the art and such and other modifications in the structure, arrangement and relationship of the several parts and components may therefore be utilized if desired without departing from the spirit and scope of the invention as defined in the appended claims.

I claim:

1. Apparatus of the character described comprising sets of parallel cutting blades disposed one above the other in parallel, transversely offset relation, the blades presenting upwardly directed cutting edges, supporting frames for the blades each including means for maintaining the blades of one set under longitudinal tension, means receiving said frames for holding them in vertically aligned relation, an arm pivotally secured to said last mentioned means comprising a plurality of parallel sided impeller blades adapted to enter and pass through spaces between adjacent cutting blades in both sets and having curved edges adapted to rotate an article disposed on said cutting blades when the impeller blades are moved in contact with said article toward said cutting blades.

2. Apparatus as defined in claim 1 in which each follower blade comprises a rectilinear edge portion extending away from the pivotal axis of said arm at a small angle to a radial plane through said axis, said edge portion outwardly from said axis merging into an arcuate portion for facilitating rotation of the article.

3. Apparatus as defined in claim 1, in which one of the blade frames at the intersections of its sides and ends carries corner brackets adapted to engage the corner portions of the other blade frame for maintaining parallelism between the blades of each said frame relatively to those of the other said frame.

References Cited

UNITED STATES PATENTS

| | | | |
|---|---|---|---|
| 1,748,997 | 3/1930 | Rentos | 146—169 |
| 2,466,121 | 4/1949 | Norman | 146—169 |
| 3,369,582 | 2/1968 | Giangiulio | 146—169 |

WILLIE G. ABERCROMBIE, Primary Examiner